United States Patent [19]

Bertucco

[11] Patent Number: 5,028,099
[45] Date of Patent: Jul. 2, 1991

[54] TRASH RECYCLING CONTAINER

[76] Inventor: Leonard J. Bertucco, 37 Ridge Rd., Farmingdale, N.Y. 11735

[21] Appl. No.: 564,089

[22] Filed: Aug. 8, 1990

[51] Int. Cl.$^5$ .................................................. H47B 91/00
[52] U.S. Cl. .................................. 312/250; 312/140.3; 312/244; 211/50; 248/95
[58] Field of Search .............. 100/34; 211/50; 248/95; 312/250, 244, 234.1, 234, 140.2, 140.3

[56] References Cited

U.S. PATENT DOCUMENTS

| | | | |
|---|---|---|---|
| 171,495 | 12/1875 | Ambereg | 312/234.5 |
| 2,636,432 | 4/1953 | Sherer | 211/50 X |
| 2,897,034 | 7/1959 | Kalen | 312/244 X |
| 2,981,549 | 4/1961 | Hotton | 312/250 X |
| 3,356,434 | 12/1967 | Theodores | 312/250 |
| 3,739,714 | 6/1973 | Howard | 211/50 X |
| 4,369,763 | 1/1983 | Sullivan . | |
| 4,558,800 | 12/1985 | Isgar et al. | 248/95 X |

*Primary Examiner*—Joseph Falk
*Attorney, Agent, or Firm*—Michael I. Kroll

[57] ABSTRACT

A trash recycling container is provided and consists of a plurality of drawers, each hold one type of trash therein and slideable within a front of the cabinet. A mechanism one the cabinet is for transporting the cabinet to a remote location so that the drawers with their different types of trash can be removed allowing the trash to be dumped into separate pails for recycling.

1 Claim, 2 Drawing Sheets

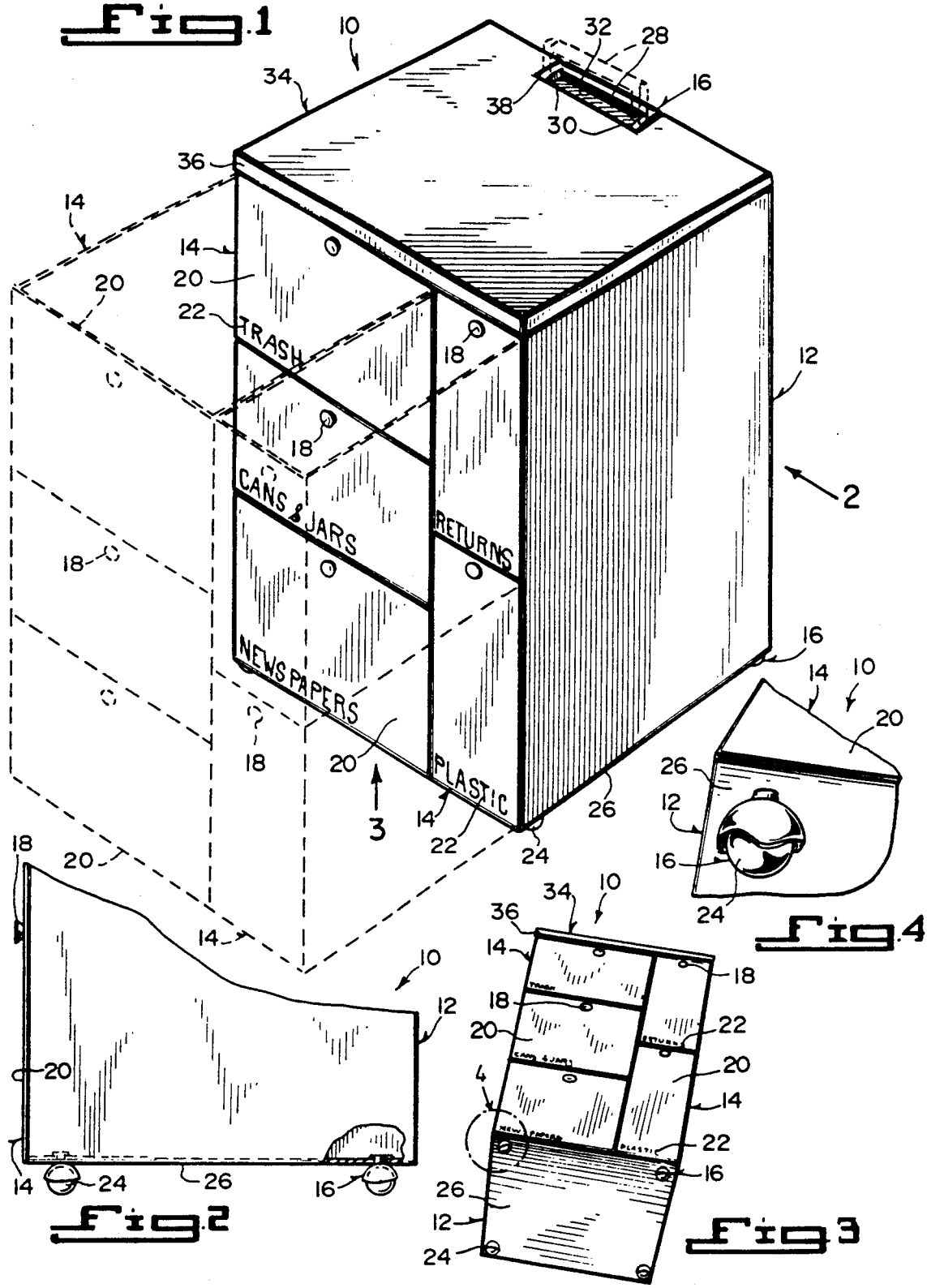

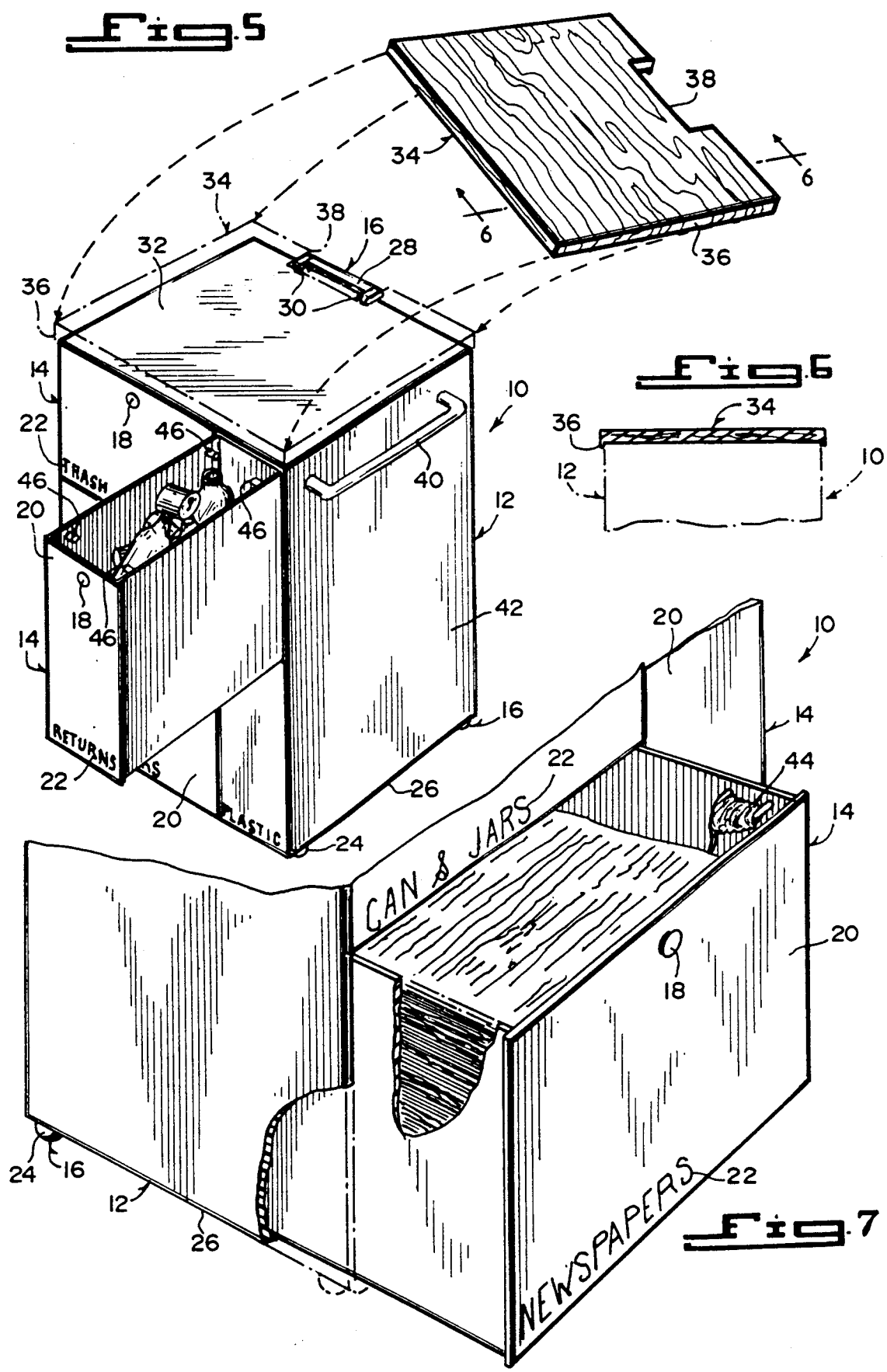

TRASH RECYCLING CONTAINER

BACKGROUND OF THE INVENTION

1. Field of the Invention

The instant invention relates generally to trash baskets and more specifically it relates to a trash recycling container.

2. Description of the Prior Art

Numerous trash baskets have been provided in prior art that are adapted to be of one receptacle types in which all unsorted garbage is placed into the trash baskets and then carried outside so that garbage which is the mixed together can be dumped into pails. While these units may be suitable for the particular purpose to which they address, they would not be as suitable for the purposes of the present invention as heretofore described.

SUMMARY OF THE INVENTION

A primary object of the present invention is to provide a trash recycling container that will overcome the shortcomings of the prior art devices.

Another object is to provide a trash recycling container having a plurality of front sliding drawers that each hold one type of trash therein so that the trash can be sorted for recycling purposes.

An additional object is to provide a trash recycling container that has a removable formica top so that the container can be installed under a permanent kitchen counter.

A further object is to provide a trash recycling container that is simple and easy to use.

A still further object is to provide a trash recycling container that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view from the right side thereof of the instant invention.

FIG. 2 is a right side view as indicated by arrow 2 in FIG. 1, with parts broken away.

FIG. 3 is a bottom perspective view as indicated by arrow 3 in FIG. 1.

FIG. 4 is an enlarged bottom perspective view as indicted by arrow 4 in FIG. 3, showing one of the casters in greater detail.

FIG. 5 is a front perspective view from the right side thereof with the formica top exploded therefrom and one of the drawers for returns opened.

FIG. 6 is a cross sectional view taken along line 6—6 in FIG. 5, through the formica top.

FIG. 7 is a front perspective view from the left side thereof with parts broken away and one of the drawers for newspapers opened.

DETAILED DESCRIPTION OF THE PREFERRED EMBODIMENTS

Turning now descriptively to the drawings, in which similar reference characters denote similar elements throughout the several views, the Figures illustrate a trash recycling container 10 consisting of a cabinet 12 and a plurality of drawers 14. Each drawer 14 holds one type of trash therein and is slideable within the front of the cabinet 12. A mechanism 16 on the cabinet 12 is for transporting the cabinet 12 to a remote location so that the drawers 14 with their different types of trash can be removed therefrom allowing the trash to be dumped into separate pails for recycling.

Each drawer 14 further contains a knob 18 affixed onto its front panel 20 so that the drawer 14 can be pulled out from the cabinet 12. Indicia 22 is printed on the front panel 20 of the drawer 14 to identify the type of trash held within the drawer 14. The indicia 22 are words, such as trash, cans and jars, newspapers, returns, plastic and the like.

The transporting mechanism 16 includes a plurality of casters 24 affixed to the bottom wall 26 of the cabinet 12 and a handle 28 hinged at 30 to the back of the top wall 32 of the cabinet 12 so that a person can grip the handle 28 and move the cabinet 12 along the ground on the casters 24 to the remote location.

The trash recycling container 10 further includes a formica top 34 having a flange 36 about its perimeter and a cutout area 38 for the handle 28, allowing the formica top to be removably attached over the top wall 32 of the cabinet 12 so that when the cabinet 12 is to be installed under a permanent kitchen counter the formica top 34 will be removed therefrom.

To use the trash recycling container 10, a person simply fills each drawer 14 with its type of trash, as indicated on the front panel 20, until each drawer 14 is full. The handle 28 is then gripped and the cabinet 12 moved to the remote location. The drawers 14 are then removed with each type of trash dumped into its own separate pail to the recycled so that the trash material can be used again.

The trash recycling container 10 can further include a removable towel rack 40 on one side panel 42 of the cabinet 12. A built-in twine dispenser 44 can also be located within the drawer 20 for newspapers, while four posts 46 can be located within each of the other drawers 20. Each post 46 is horizontally affixed at one corner thereof, so as to hold a plastic bag like those found in supermarkets. In this way each plastic bag can be filled with its respective trash and removed from the drawer 20 and carried away.

LIST OF REFERENCE NUMBERS

10—trash recycling container
12—cabinet
14—drawer
16—transporting mechanism
18—knob on 20
20—front panel of 14
22—indicia on 20
24—caster
26—bottom wall of 12
28—handle
30—hinge on 28
32—top wall of 12
34—formica top
36—flange on 34

38—cutout area on 34
40—removable towel rack
42—side panel of 12
44—twine dispenser
46—post It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A trash recycling container comprising:
   a) a cabinet;
   b) a pluralty of drawers, each said drawer holds one type of trash therein and is slideable within the front of said cabinet, said each said drawer further includes a knob affixed thereto so that said drawer can be pulled out from said cabinet and indicia printed on the front panel of said drawer to identify the type of trash held within said drawer;
   c) means on said cabinet for transporting said cabinet to a remote location so that said drawers with their different types of trash can be removed therefrom allowing the trash to be dumped into separate pails for recycling, said transporting means include a plurality of casters affixed to the bottom wall of said cabinet and a handle hinged to the back of the top wall of said cabinet so that a person can grip said handle and move said cabinet along the ground on said casters to the remote location;
   d) a formica top having a flange about its peimeter and a cutout area for said handle allowing said formica top to be removably attached over the top wall of said cabinet so that when said cabinet is to be installed under a permanent kitchen counter said formica top will be removed therefrom;
   e) a removable towel rack on one side panel of said cabinet;
   f) a built-in twine dispenser located within said drawer for the newspapers; and
   g) four posts located within each of said other drawers, each said post horizontally affixed at one corner thereof, so as to hold a plastic bag, like those found in supermarkets.

* * * * *